Feb. 23, 1960 R. R. ROSS 2,925,748
FASTENING APPARATUS
Filed July 19, 1954 2 Sheets-Sheet 2
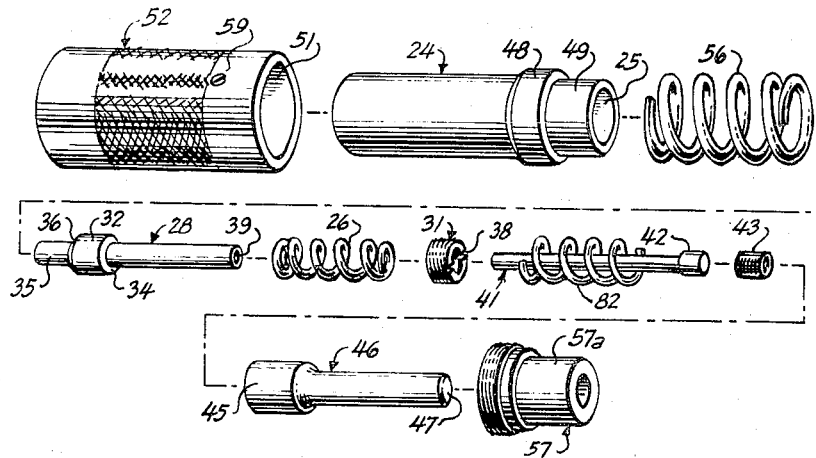
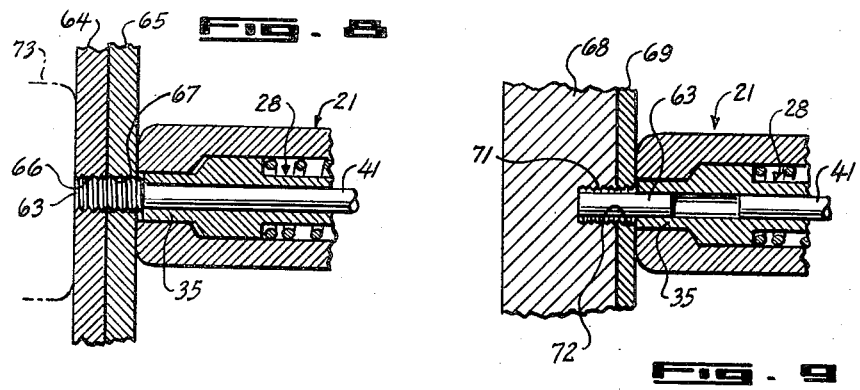
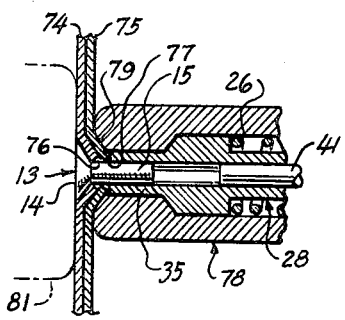
INVENTOR:
Ralph R. Ross
BY
Walter J. Jason
ATTORNEY United States Patent Office 2,925,748
Patented Feb. 23, 1960

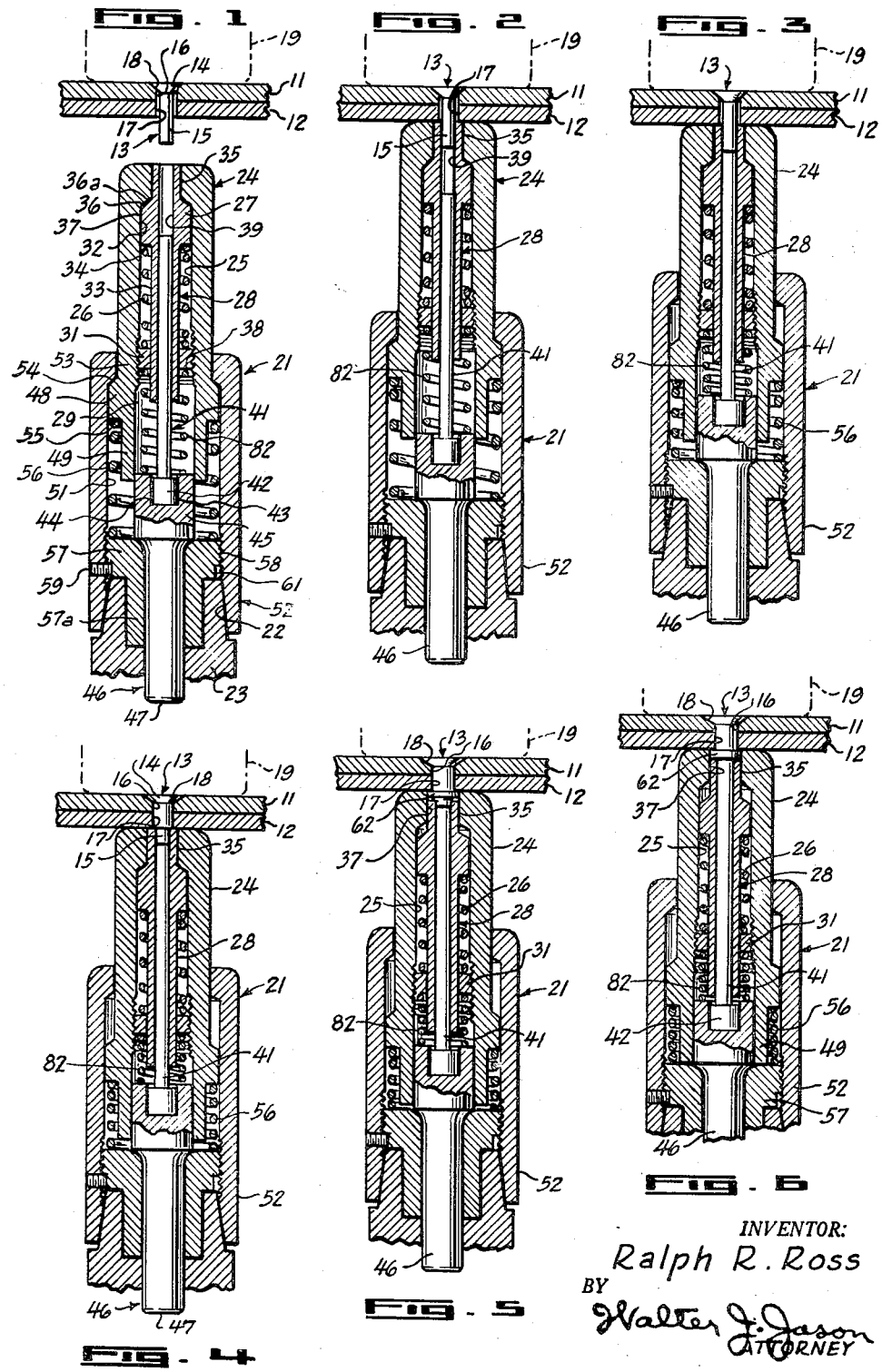

2,925,748

FASTENING APPARATUS

Ralph R. Ross, Chula Vista, Calif.

Application July 19, 1954, Serial No. 444,278

6 Claims. (Cl. 78—48)

The present invention relates generally to the art of fastening, and more particularly to apparatus for fastening together parts and assemblies by means of rivets or wire pin type fasteners.

Heretofore, it has been common practice in the art of fastening to secure together parts and assemblies by a method commonly referred to as "reaction riveting." This method utilizes a rivet having a shank portion and an integral manufactured head portion, the shank portion being disposed through and protruding from suitable, aligned holes provided in the parts or sheets to be assembled, while the head portion may, depending upon the particular application involved, either be disposed externally, resting upon the sheets, or may be disposed internally, resting within a countersunk hole in one of the sheets for example. A bucking die is then positioned against the manufactured head portion of the rivet and generally also upon the immediate surface of the sheet within which or upon which the rivet head is located, and driving means, such as a conventional rivet gun, are placed against the protruding end of the shank portion of the rivet. Next, the driving means are suitably actuated to flatten or upset the shank end which protrudes through the holes of the sheets to be assembled. There are many variations of driving means for effectuating this riveting method, including automatic machine tools of various types, but essentially all of these variations function or operate to deform one end of a rivet while maintaining it in position.

The reaction riveting method, including the tools adapted for use therewith, is undesirable for various reasons. For example, with regard to the rivet holes which are provided in the sheets to be assembled, these holes conventionally are of a diameter just sufficient to permit insertion of the shank portion of the rivet. If excessive clearance exists between the rivet hole and the shank portion of the installed rivet, it is evident that vibration and repeated operational stressing of the sheets can easily cause undesirable relative movement between these sheets, resulting in concentrated and destructive impact stresses at the periphery of the rivet holes, with consequent elongation thereof or failure of the rivet. Further, this relative movement may be additive throughout a riveted structure, and thus could result in prohibitively high distortion of the structure. It has been found that the previously described reaction riveting method is deficient in that it fails to cure these difficulties. Thus, instead of expanding the rivet, and especially the shank portion thereof, to completely fill the rivet opening, the reaction riveting method effects mainly a deformation of the protruding portion of the shank of the rivet while leaving essentially undisturbed the undesirable clearance which may exist between the shank and the hole. This is particularly disadvantageous in those situations where a fluid tight connection is desired, or in those production applications for riveting wherein the rivet holes are purposely made oversize for practical considerations, such as to enable insertion of rivets in slightly misaligned rivet holes.

Another disadvantage of the conventional reaction riveting method is its failure to always provide a clamping or clinching action for holding together the parts to be assembled. Instead, the method mainly depends upon continued deformation or upsetting of the protruding shank end of the rivet to provide the desired clamping force, and, in attempting to achieve this result, rivet operators, and especially inexperienced operators, sometimes overdrive the rivet. Such overdrive generally results in work hardening of the upset head to such an extent that there results an undesirable splitting and cracking of the head and consequent loss of shear and tensile strength. In addition, the prior riveting methods are further undesirable in those instances wherein flush riveting is used, as in aircraft applications in which important aerodynamic considerations are involved. A flush rivet head preferably should completely fill the countersunk opening in which it is seated for reasons similar to those described above in connection with the shank portion of a rivet, that is, dimensional discrepancies which are not compensated for will effect undesirable stress concentrations and possible premature failure of the rivet as a consequence. In addition, gaps and discontinuities between the rivet and the opening within which it is seated will partially destroy the aerodynamic benefits which may be derived from efficient flush rivets. To intimately join the rivet head to its seat it is evident that an upsetting or axial flow of the material in the rivet head will be necessary. However, the reaction method of riveting is unsatisfactory in this respect since the riveting machine or tool used therewith generally upsets only the shank end of the rivet without achieving significant reformation or radial expansion of the rivet head within its opening or seat.

Accordingly, in the present invention there is provided a fastening apparatus which is adapted to substantially obviate the disadvantages of present riveting practice. Thus, for example, using a conventional rivet disposed through complemental holes in a pair of mating plates or sheets, together with a conventional bucking die disposed against the manufactured head of the rivet, a fastening tool is provided which embodies a spring loaded outer member within which there is slidably disposed a spring loaded inner member. This inner member, in turn, slidably accommodates an impact element which is actuated through operative association with the usual and conventional rivet gun, rivet machine, or the like. The protruding shank end of the rivet is disposed within and in close peripheral relation with the interior of the inner member, this disposition or housing of the protruding rivet shank within the inner member being as intimate as possible, having due regard for the slight irregularities which may exist in the diameter and shape of the shanks of rivets of presumably the same type and size. The outer member of the present invention bears against the outer surface of the adjacent sheet to provide a clamping action simultaneous with the exertion by the impact member of an axial compressive force or impact against the shank end of the rivet then disposed within the inner member. The inner member prevents bulging or upsetting of the enclosed rivet shank, thus concentrating the repeated impact of the impact element at the rivet head. This arrangement of components affords a progressive radial expansion of the rivet shank from the rivet head toward the rivet end until the rivet openings in the sheets are substantially completely packed or filled. At this time the inner member withdraws into the outer member, automatically permitting the formation of an upset head of predetermined size and shape, thus preventing inadvertent and undesirable overdriving of the rivet.

It is therefore a principal object of the present invention to provide an improved fastening apparatus which is adapted to effect a radial expansion of the shank of a fastener, such as a rivet, wire pin, or the like, before any upsetting occurs of that portion of the fastener shank which protrudes or is external of the part to be assembled.

It is a further object of the invention to provide a unique apparatus for riveting which embodies means for confining the protruding shank end of a rivet against deformation until the remainder of the rivet has been caused to expand or flow to fill the openings wherein it is accommodated.

An additional object of the invention is the provision of a novel fastening apparatus which provides a clamping together of the parts to be joined and a confinement of the protruding shank of the rivet until those portions of the rivet disposed within the openings therefor have been deformed or expanded to completely fill such openings.

Another object of the invention is to provide an improved fastening apparatus which embodies means for defining the shape and size of the upset head of a rivet while simultaneously exerting a resilient clamping action upon the parts to be joined.

It is a still further object of the invention to provide a fastening apparatus of an improved nature which includes means for effecting a radial expansion of a rivet until the openings provided therefor in the parts to be joined are completely filled, and next automatically shaping the upset head to predetermined size and shape.

An additional object of the present invention lies in the provision of a novel fastening apparatus which tends to abate and dampen the vibration and noise generally attendant upon present day riveting operations.

Another object of the present invention lies in the provision of a unique fastening apparatus which is comparatively simple and inexpensive to manufacture either as an attachment for a conventional riveting gun or machine, or as an integral, operative gun by itself, and which is readily adapted for use by relatively inexperienced operators.

Other objects and features of the present invention will be readily apparent to those skilled in the art from the following specification and appended drawings wherein is illustrated a preferred form of the invention, and in which:

Figure 1 is a longitudinal sectional view of a fastening apparatus constructed in accordance with the preferred embodiment of the present invention and illustrating the relative positions of the components prior to the fastening operation;

Figure 2 is a view similar to Figure 1, illustrating the relative positions of the components after the apparatus has been placed over the protruding end of the rivet;

Figure 3 is a view similar to Figure 1, illustrating the relative positions of the components upon application of clamping force by the outer sleeve;

Figure 4 is a view similar to Figure 1, illustrating an intermediate phase of the fastening operation;

Figure 5 is a view similar to Figure 1, illustrating the partial formation of the upset rivet head, and the automatic retraction of the inner sleeve;

Figure 6 is a view similar to Figure 1, illustrating the completion of the fastening operation, full retraction of the inner sleeve having been achieved;

Figure 7 is an exploded perspective view of the various components forming the fastening apparatus of the present invention;

Figure 8 is a longitudinal sectional view of the fastening apparatus being used in combination with a bucking die to form a threaded pin fastener for securing together a pair of plates;

Figure 9 is a longitudinal sectional view illustrating the fastening apparatus being used to form a threaded pin fastener for securing together a plate and a part of relatively large mass and cross section; and Figure 10 is a longitudinal sectional view illustrating another embodiment of the fastening apparatus being used in combination with a bucking die for securing together a pair of suitably dimpled sheets by means of a flush type rivet disposed therein and through openings in the sheets.

Referring to the drawings and more particularly to Figures 1 and 7, there is illustrated an embodiment of the invention which is adapted for use in fastening together a pair of plates 11 and 12 by means of a countersunk or flush type fastener or rivet, generally designated 13, although it is to be understood that the fastening apparatus of the present invention is also adapted for securing together a greater plurality of plates or sheets, various parts and assemblies, and the like, and in addition is adapted for use in connection with various types of rivets, including a threaded wire type fastener, as will be seen.

The standard pre-formed rivet 13 is comprised of a head 14 formed on one end and an elongated body or shank 15. As illustrated, shank 15 is disposed through a pair of holes 16 and 17 which are provided in plates 11 and 12, respectively, by any suitable means such as by drilling or punching, with head 14 being disposed in a suitable countersunk hole or opening 18 provided in plate 11. As stated previously, head 14 may be any one of a number of standard shapes but by way of illustrating a novel feature of the present invention, as will be described hereinafter, a head 14 of the countersunk type is shown. In addition, a bucking die 19, indicated in phantom in the several views, and which may be of any usual and conventional shape for complemental association with rivet 13, is employed to hold rivet 13 in position during the fastening, riveting or rivet setting operation.

The apparatus for setting rivet 13, and constituting the preferred embodiment of the present invention, comprises a fastening apparatus or device indicated generally by the numeral 21, and adapted for use in combination with a usual or standard riveting gun or riveting machine, as desired. As illustrated, device 21 is connected at 22 to an end fitting 23 of a conventional rivet gun (not shown) of the pneumatic type, such connection being by any suitable means such as set screws, bolts, or threaded connection as desired. It is noted that use of device 21 in connection with riveting machines and guns of any of various types is contemplated, and that such riveting machines or guns may be operable by mechanical, pneumatic, electrical or hydraulic means.

Device 21 comprises generally an outer housing or sleeve 24 which is internally bored at 25 to house a compression spring 26 and also to provide a guide for a head portion 27 of a shank holding die, inner housing or sleeve 28. In addition, bore 25 is provided with internal threads 29 to accommodate a threaded annular spring retainer 31, one end of spring 26 being adjustably restrained by spring retainer 31, as will be seen.

Inner sleeve 28 includes a short cylindrical portion 32 which is slidably fitted within bore 25, and also includes a downwardly extending boss portion 33. Portion 33 is provided with an outside diameter which is smaller than portion 32 whereby a radial shoulder 34 is defined against which the upper end of spring 26 bears, the lower end of spring 26 being engaged by spring retainer 31, as stated. Inner sleeve 28 further includes an upwardly extending short boss portion 35 which has a smaller outside diameter than cylindrical portion 32 to define a sloping shoulder 36 which, as illustrated, is adapted to engage a complementary shoulder 36a interiorly formed in sleeve 24 and in surrounding relation to a bore extension 37 of bore 25, bore extension 37 being of lesser diameter than bore 25 and slidably accommodating boss portion 35 therein. Thus, shoulder portion 36 forms an upper stop which will limit the upward travel of inner sleeve 28 in opposition to the upward urging of inner sleeve 28 by spring 26. In this connection it is noted that the force exerted by spring 26 may be adjusted by relocating the position of spring retainer 31 within bore 25 along the threaded connection at internal threads 29, a slot 38 being provided in the lower face of spring retainer 31 to accept a suitable tool, such as a screw-driver, to facilitate such adjustment.

Inner sleeve 28 embodies an internal bore 39 which is adapted to closely accommodate and embrace the full length of the protruding end of shank 15 of rivet 13. Inner sleeve 28 is also adapted to slidably accommodate within its lower end a hammer 41, which here for the purposes of illustration is assumed to be of the impact type, but which it is obvious could also be of the squeeze type, includes a cylindrical and integral head portion 42 at its lower end. As is evident, the relative diametral size of bore 39 of inner sleeve 28 and of head portion 42 of hammer 41 serves to prevent the inadvertent or accidental ejection of hammer 41 from device 21 through bore 39 for safety reasons when the device 21 is not in position upon the shank of a rivet. It is noted that the relative length of inner sleeve 28 is selected such as to permit the formation of the upset head 62 to the predetermined and desired shape and thickness.

Head portion 42 is surrounded by an annular ring or bushing 43 which is made of a suitable elastomeric material such as neoprene rubber for example, and head portion 42 together with bushing 43 is frictionally maintained within a slightly smaller diameter mating cylindrical bore or concavity 44 which is provided in the upper portion 45 of a reciprocable hammer element 46.

Hammer element 46, which is slidable within end fitting 23, includes at its lower end an anvil face 47 adapted to be struck by the hammer of a reciprocating riveting machine, or through engagement with the pressure producing elements of a squeeze type of riveting machine, the latter squeeze type machine being especially practicable when rivet 13 is made of organic material. Thus, anvil face 47 is actuated by a rivet gun, machine, or the like to produce axial movement, as for example reciprocable sliding movement, of upper portion 45 within the lower portion of bore 25, and consequently producing, by virtue of the frictional engagement of hammer 41 with hammer element 46, a similar reciprocating sliding movement of hammer 41 within internal bore 39. It is noted that such frictional engagement together with the arrangement of other components of the present invention is conducive to desirable sound deadening properties during the fastening or riveting operation. In addition, bushing 43 also permits a slight misalignment between hammer 41 and hammer element 46.

Outer sleeve 24 includes a larger diameter mid-portion 48 and a downwardly extending boss portion 49, midportion 48 being freely slidable within an internal bore 51 of an attachment sleeve 52 which is connected at 22 to end 23 of the rivet gun.

Attachment sleeve 52 at its upper end embodies a bore extension 53 of lesser diameter than internal bore 51 and adapted to slidably engage the outer periphery of outer sleeve 24, and further adapted, by virtue of the shoulder formed by the difference in diameters between bore extension 53 and internal bore 51, to provide an upper limit or stop at a shoulder 54 for the upward travel of mid portion 48 within internal bore 51. In addition, the difference in diameters between boss portion 49 and mid portion 48 forms a radial shoulder 55 against which the upper end of a compression spring 56 is disposed, the lower end of spring 56 being engaged by the upper surface of an annular collar 57 which is threadably secured within internal bore 51 at a threaded portion 58 thereof. Compression spring 56 is circumferentially disposed about boss portion 49, and develops a compressive force against radial shoulder 55 and collar 57, tending to urge mid portion 48 into engagement with shoulder 54.

Collar 57 includes a downwardly extending reduced diameter portion 57a, as illustrated, which fits within a complementary opening therefor in fitting 23 of the rivet gun, the central opening in collar 57 being adapted for slidably accommodating hammer element 46. Further, by virtue of the large diameter of upper portion 45 of hammer element 46 as compared to the diameter of the central opening in fitting 23 of the rivet gun, fitting 23 serves as a stop for limiting the downward travel of hammer element 46. Collar 57 is connected to attachment sleeve 52 by any suitable means, such as by a set screw 59 which is disposed through a suitably threaded opening in attachment sleeve 52 and bears against a boss portion 61 of collar 57 to thereby normally prevent rotation thereof.

The normal positions of the various components prior to the fastening operation of device 21 of the present invention are illustrated in Figure 1. As seen, spring 26 urges head portion 27 of inner sleeve 28 into contact with shoulder portion 36 whereby boss portion 35 is flush at its upper surface with the upper surface of outer sleeve 24, while compression spring 56 exerts its bias to urge mid portion 48 for engagement with shoulder 54. Anvil face 47, and consequently hammer 41, as seen, are in their lowest positions.

Figures 1 through 6 illustrate successive stages in the fastening operation performed by device 21 and, as will become apparent in the description hereinafter made, this operation consists in effecting a radial expansion of the rivet shank prior to the upsetting of that portion of the shank end of the rivet which protrudes from plates 11 and 12.

In Figure 1, rivet 13 has been disposed through holes 16 and 17 of plates 11 and 12, respectively, with bucking die 19 against head 14 to maintain rivet 13 in position. Next, device 21 is moved into position in alignment with rivet 13 and inner sleeve 28 is placed about shank 15 whereby shank 15 is enclosed throughout its protruding length within internal bore 39 of inner sleeve 28, as best seen in Figure 2. It is particularly to be noted and it is particularly emphasized that the complete protruding length of shank 15 of rivet 13 is thereby closely embraced and supported against upsetting during the initial portion of the riveting operation. In addition, the upper ends of boss portion 35 of inner sleeve 28 and outer sleeve 24 are placed in abutment and firm contact with contiguous portions of plate 12, including the portions of plate 12 which define hole 17 in plate 12, including the portions of plate 12 which define hole 17 in plate 12, thereby positively supporting such hole defining portions of plate 12 against any tendency to yield downwardly during the fastening operation.

The next phase of the unique fastening operation of the present invention is illustrated in Figure 3 wherein outer sleeve 24 is urged upwardly against plates 11 and 12 by the operator, or through the automatic action of a riveting machine, as the case may be, to thereby effect in combination with bucking die 19, a clamping of clinching action upon plates 11 and 12, such clinching action being resilient for the reason that compression spring 56 yields under the urging of outer sleeve 24 against plates 11 and 12.

Actuation of the riveting gun or machine effects an application of axial compressive forces upon anvil face 47 of hammer element 46, these forces serving to deform the rivet 13 in the desired manner through the consequent engagement or impingement of hammer 41 against the lower end of shank 15 of rivet 13.

The axial compressive forces exerted, in the present example, by hammer 41 against the lower end of shank 15 of rivet 13 cause a radial expansion of head 14 of rivet 13 to completely fill the opening 18 in which it is seated whereby irregularities or other dimensional defects of opening 18 or head 14 are compensated by the radial expansion and filling described. Next, that portion of shank 15 which is disposed within plates 11 and 12 is caused to radially expand in a manner similar to that described in connection with head 14 of rivet 13, this radial expansion effectively and completely filling the openings 16 and 17 of plates 11 and 12. At all times thus far, it is particularly noted that the protruding portion of shank 15 of rivet 13 is constrained by the action of boss portion 35 of inner sleeve 28 against any radial expansion, bulging or deformation, as illustrated in Figure 4. In addition, from a comparison of Figures 1 through 4 it is seen that there has been a progressive relative movement between outer sleeve 24 and attachment sleeve 52 by virtue of the progressively shortening length of shank 15 of rivet 13, and corresponding gradual compression of spring 56.

As the application of axial impact forces by hammer 41 against rivet 13 is continued, the material of rivet 13 will be forced against the hole defining periphery of hole 16, hole 17, and opening 18 and thence downwardly against the upward end of boss portion 35 of inner sleeve 28. When the force of the material of rivet 13 against boss portion 35 rises to a value substantially equal to the upward force exerted by spring 26 against inner sleeve 28, inner sleeve 28 will begin to move downwardly within bore 25, with the upper end of outer sleeve 24 yet remaining in urged contact with the under surface of plate 12, as illustrated in Figure 5.

As the fastening operation is continued, the remaining material of rivet 13 flows under the applied force into a cylindrical upset head 62, with an accompanying downward movement of inner sleeve 28 against the force of spring 26 whereby bore extension 37 of outer sleeve 24 acts as a die to define the shape and limit the diameter of upset head 62, as seen in Figures 5 and 6. Since undesirable elongation of holes 16 and 17 and opening 18 may occur if the force exerted by spring 26 is too great, the yield strength of the material of plates 11 and 12 is ordinarily determinative of the bias of spring 26 which is to be used, a greater yield strength obviously dictating a correspondingly stronger spring force. It will be apparent that to achieve various values of spring forces the position of spring retainer 31 is adapted to be adjusted along bore 25 to afford compression or elongation of spring 26 to thereby effect the desired spring force.

In Figure 6, it is seen that compression spring 56 has been completely compressed and the lower end of boss portion 49 rests in abutment with the upper edge of collar 57, at which point in the riveting operation the formation of the upset head 62 is accomplished, and the fastening operation has been completed. It is apparent from Figure 6 that though the lower end of boss portion 49 on completion of the riveting operation engages collar 57, the head portion 42 of hammer 41 lies spaced from the lower end of inner sleeve 28. This condition of inner sleeve 28 and boss portion 49 signals to the operator by a change in the sound of operation of device 21 that the fastening operation has been completed and that further driving of the rivet is unnecessary.

Figures 8, 9, and 10 illustrate additional applications for the fastening apparatus of the present invention, Figures 8 and 9 being directed to an application utilizing an elongated member or wire pin 63. As shown in Figure 8 a pair of mating plates 64 and 65 are provided with openings 66 and 67, respectively, which are characterized by corrugations or threads as illustrated. On the other hand, in Figure 9 a block 68 of comparatively great mass is to be assembled to a plate 69, block 68 being provided with a bottomed recess 71 and plate 69 being provided with a through opening 72, both openings 71 and 72 being characterized by corrugations or threaded peripheral portions similar to the corrugations or threads of openings 66 and 67. Inasmuch as the embodiments illustrated in Figures 8 and 9 are substantially identical, except that in Figure 8 a conventional bucking die 73 is used whereas in Figure 9 the large mass of block 68 itself serves as an integral bucking die, it is to be understood that the description hereinafter made with respect to the installation of wire pin 63 is applicable to either Figure 8 or Figure 9.

Openings 66 and 67, or 71 and 72, are preferably made just large enough to enable easy insertion of wire pin 63, as best illustrated in Figure 9. Next, device 21 is placed against plate 65, or plate 69 as applicable, in alignment with wire pin 63 with boss portion 35 of inner sleeve 28 enclosing the protruding end of wire pin 63. Device 21 is urged against plate 65, or plate 69, and this urging is opposed by the urging of the bucking die 73 against plate 64, or by the structural rigidity of block 68. A desired clamping or clinching together of plates 64 and 65, or block 68 and plate 69, is thus achieved.

The protruding end of wire pin 63 is then struck or squeezed by the left end of impact hammer 41, thereby radially expanding wire pin 63 progressively from the left to the right and filling openings 66 and 67, or openings 71 and 72 as the case may be. During the operation thus far, it is noted that boss portion 35 of inner sleeve 28 has closely constrained the protruding end of wire pin 63 against any upsetting or radial expansion, but instead has effected a confinement of such upsetting or radial expansion to that portion of wire pin 63 which is disposed within the plates which are to be assembled.

Wire pin 63 may be made of a length, if desired, such that upon complete radial expansion of wire pin 63 within its plate openings, there will be no material of wire pin 63 protruding above the surfaces of the assembled plates. On the other hand, wire pin 63 may be made of a length such that after complete radial expansion of pin 63, a sufficient amount of material of wire pin 63 yet remains to thereby provide material for the formation of an upset head identical to the upset head 62 which was formed on rivet 13 in the riveting operation previously described in connection with Figures 1 through 6.

In Figure 10 there is illustrated another embodiment of the fastening apparatus of the present invention, this embodiment being particularly adapted for use for fastening together of dimpled plates by a rivet type connection. A pair of sheets 74 and 75 are provided with a pair of openings 76 and 77, respectively, whose peripheral edges are formed by dimpling means whereby sheet 74 is adapted to seat or accommodate head 14 of the usual and conventional rivet 13. As is well known, such dimpled construction is employed where the installation of flush rivets is desired but the thickness of the sheets to be assembled is not great enough to embody the usual countersunk openings used with flush rivets. Instead, thin sheets 74 and 75 are suitably dimpled to permit such desired use of flush rivets. However, the deformation or radial expansion of shank 15 of rivet 13 within openings 76 and 77 is just as important to the efficiency and strength of the riveted connection here as it is in those applications above described. Likewise, the formation of an upset head having a predetermined shape and size is also desirable. Accordingly, the riveting device is arranged in axial alignment with rivet 13, with boss portion 35 of inner sleeve 28 completely enclosing the protruding end of shank 15 of rivet 13. The enclosure of shank 15 within boss portion 35 is such that shank 15 is housed and supported along its entire protruding length, the left end of boss portion 35 being in abutment with the adjacent portions of the dimpled periphery of opening 77, and urged thereagainst by spring 26 as opposed by a conventional bucking die 19. As illustrated, an outer sleeve 78 is employed instead of the outer sleeve 24 previously described, a difference therebetween being the provision of an annular shoulder or seat 79 at the left end of outer sleeve 78. Seat 79 is adapted to support and to be urged against the under surface of the dimpled portion of sheet 75, and, as hammer 41 is repeatedly driven or squeezed against the end of shank 15 of rivet 13, outer sleeve 78 is urged against sheets 74 and 75, and opposed by bucking die 81, to thereby provide a clamping or clinching together of sheets 74 and 75 and also to provide a support for the dimpled portions during the radial expansion of rivet 13 during the fastening or riveting operation. More specifically, the thin dimpled portions of sheets 74 and 75 are constrained by outer sleeve 78 against radial distortion, that is, enlargement of the dimpled openings for rivet 13, which may be caused by the force of the expanding material of rivet 13.

As the riveting operation is continued, the material of rivet 13 effects a movement of boss portion 35 to the right against the force of spring 26, in a manner identical to the movement of the boss portion 35 which has previously been described in connection with Figures 1 through 6, to effect the formation of the desired upset head 62 of predetermined diameter and shape.

In the functioning of the various embodiments of the present invention, repositioning of the components of device 21 for successive cycles of operation is readily accomplished. It is important that hammer 41 be retracted to the position shown in Figure 1 in order that the next rivet 13 may be quickly and easily accommodated in bore 39, and also in order that hammer element 46 will be in its downward position in preparation for striking or squeezing of anvil face 47 by the riveting gun or machine (not shown). Thus, to locate hammer 41 and hammer element 47 in the position described, there may be provided a compression spring 82 which is circumferentially disposed about hammer 41, bearing at one end against spring retainer 31 and at the other end against the upper portion 45 of hammer 41.

Thus, in the manner above set forth it is seen that the fastening apparatus of the present invention effects a substantially complete radial expansion of a fastener, such as a rivet, a wire pin, or the like, within the holes or openings provided therefor, before any upsetting occurs of the protruding shank portion of such fastener. In addition, there has been described the simultaneous resilient clamping action provided by the present invention, together with the means for defining the shape and size of the upset head while such clamping action is provided.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. Riveting apparatus comprising a first sleeve member, a second sleeve member, said second sleeve member being movably positioned within said first sleeve member, spring means within said first sleeve member acting upon said second member and exerting its bias for moving the edge face of said second sleeve member into coplanar relationship with the edge face of said first sleeve member, said second sleeve member being adapted to receive the external shank portion of a fastening member disposed through openings in parts to be assembled, an upsetting element adapted for slidable movement within said second sleeve member and engageable with the end of said external shank portion of said fastening member, drive means operative upon said elongated upsetting element for exerting therethrough an axial compressive force on the end of said external shank portion of said fastening member to thereby effect a flowing of material of said fastening member to fill said openings in said parts to be assembled and thereafter form an upset head, a support member for said first member, and spring means carried by said support member and operative upon said first member to force said first member and said second member into clamping engagement with said parts to be assembled in the area thereof immediately about the periphery of said openings in said parts.

2. Riveting apparatus comprising a first member having a through bore, a second member having a through bore, said second member being disposed within the bore of said first member for slidable movement therein, spring means exerting its bias on said second member, means adjustably supported by said first member for varying the strength of the spring bias exerted on said second member, said second member being adapted to receive within its bore the external shank portion of an elongated fastening member disposed through openings in parts to be assembled, an upsetting element slidably movable within the bore of said second member for exerting an axial compressive force on the end of said external shank portion of said fastening member for forcing material of said fastening member to flow and fill said openings in said parts to be assembled and thereafter form an upset head, and spring means exerting its bias on said first member to urge said first member and said second member for engagement with that area of said parts to be assembled which is immediately about the periphery of said openings.

3. Riveting apparatus comprising a first member having a through bore, a second member having a through bore, said second member being disposed within the bore of said first member for slidable movement therein, spring means exerting its bias on said second member, means adjustably supported by said first member for varying the strength of the spring bias exerted on the said second member, said second member being adapted to receive within its bore the external shank portion of an elongated fastening member disposed through openings in parts to be assembled, an upsetting element slidably movable within the bore of said second member, a drive element for exerting an axial compressive force through said upsetting element upon the end of said external shank portion of said fastening member for forcing material of said fastening member to flow and fill said openings in said parts to be assembled and thereafter form an upset head, means for frictionally coupling said upsetting element and said drive element, and spring means exerting its bias on said first member to urge said first member and said second member for engagement with that area of said parts to be assembled which is immediately about the periphery of said openings.

4. Riveting apparatus comprising a first sleeve member, a second sleeve member, said second sleeve member being movably positioned within said first sleeve member, spring means within said first sleeve member acting upon said second sleeve member and exerting its bias for urging the edge face of said second sleeve member into coplanar relationship with the edge face of said first sleeve member, stop means for maintaining said second sleeve member within said first sleeve member, said second sleeve member being adapted to receive the external shank portion of a fastening member disposed through openings in parts to be assembled, an upsetting element adapted for slidable movement within said second sleeve member and engageable with the end of said external shank portion of said fastening member, drive means operative upon said elongated upsetting element for exerting therethrough an axial compressive force on the end of said external shank portion of said fastening member to thereby effect a flowing of material of said fastening member to fill said openings in said parts to be assembled and thereafter form an upset head, a support member having slidable engagement with said first sleeve member, stop means for maintaining said first sleeve member in slidable engagement with said support member and spring means carried by said support member and operative upon said first sleeve member to force said first sleeve member and said second sleeve member into clamping engagement with said parts to be assembled in the area thereof immediately about the periphery of said openings in said parts.

5. Riveting apparatus comprising a first sleeve member, a second sleeve member movably positioned within said first sleeve member, spring means within said first sleeve member engageable with said second sleeve member and exerting its bias for urging the edge face of said second sleeve member into coplanar relationship with the edge face of said first sleeve member, means adjustably supported on said first member for determining the force exerted by said spring means upon said second sleeve member, said second sleeve member being adapted to receive the external shank portion of a fastening member disposed through openings in parts to be assembled, an upsetting element adapted for slidable movement within said second sleeve member and engageable with the end of said external shank portion of said fastening member, a drive element, means for frictionally coupling said drive element to said unsetting element whereby said drive element is operative upon said upsetting element for exerting therethrough an axial compressive force on the end of said external shank portion of said fastening member to thereby effect a flowing of material of said fastening member to fill said openings in said parts to be assembled and thereafter form an upset head, a support member for said first sleeve member, and spring means carried by said support member and operative upon said first sleeve member to force said first sleeve member and said second sleeve member into clamping engagement with said parts to be assembled in the area thereof immediately about the periphery of said openings in said parts.

6. Riveting apparatus comprising a first sleeve member, a second sleeve member movably positioned within said first sleeve member, spring means within said first sleeve member engageable with said second sleeve member and exerting its bias for urging the edge face of said second sleeve member into coplanar relationship with the edge face of said first sleeve member, means adjustably supported on said first member for determining the force exerted by said spring means upon said second sleeve member, stop means for maintaining said second sleeve member within said first sleeve member, said second sleeve member being adapted to receive the external shank portion of a fastening member disposed through openings in parts to be assembled, an upsetting element adapted for slidable movement within said second sleeve member and engageable with the end of said external shank portion of said fastening member, a drive element, means for frictionally coupling said drive element to said upsetting element whereby said drive element is operative upon said upsetting element for exerting therethrough an axial compressive force on the end of said external shank portion of said fastening member to thereby effect a flowing of material of said fastening member to fill said openings in said parts to be assembled and thereafter form an upset head, a support member having slidable engagement with said first sleeve member, stop means for maintaining said first sleeve member in slidable engagement with said support member, and spring means carried by said support member and operative upon said first sleeve member to force said first sleeve member and said second sleeve member into clamping engagement with said parts to be assembled in the area thereof immediately about the periphery of said openings in said parts.

References Cited in the file of this patent

UNITED STATES PATENTS

| | | |
|---|---|---|
| 2,230,518 | Weinhold | Feb. 4, 1941 |
| 2,379,367 | Marchant | June 26, 1945 |
| 2,442,949 | Fisher | June 8, 1948 |
| 2,627,766 | Marchant | Feb. 10, 1953 |

OTHER REFERENCES

Ser. No. 418,834, Mayer (A.P.C.), published May 4, 1943.